E. H. CALLAWAY.
BRICK DRIER.
APPLICATION FILED SEPT. 18, 1908.
948,988.
Patented Feb. 15, 1910.
4 SHEETS—SHEET 1.
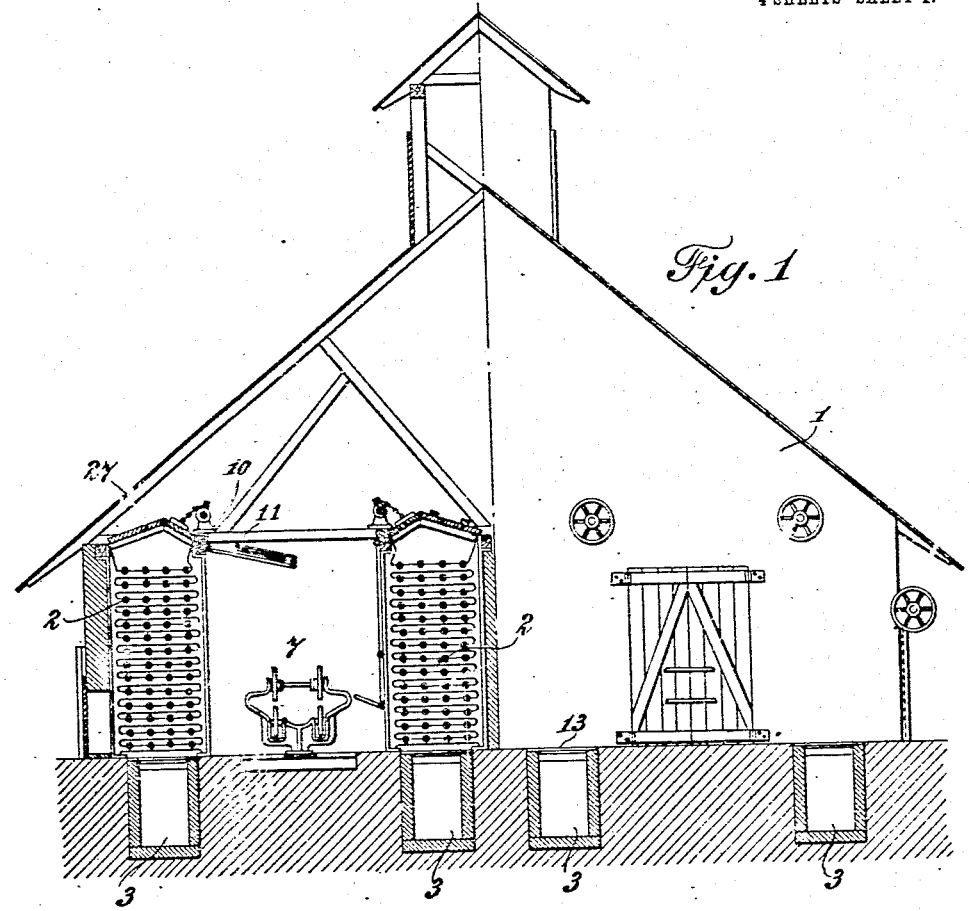
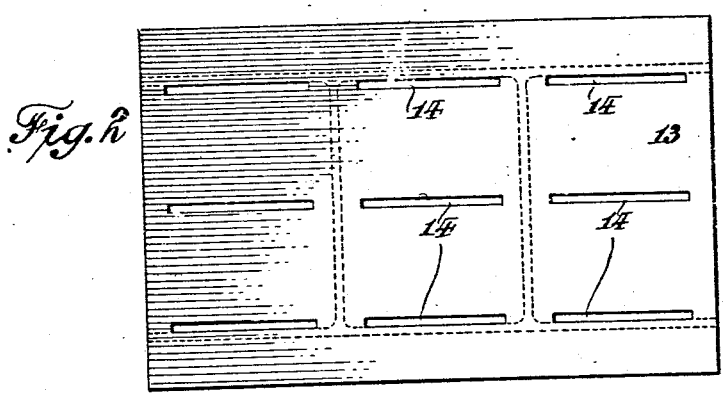
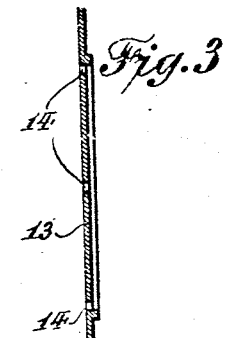
WITNESSES
INVENTOR
Edward H. Callaway,
BY Fred E. Tacker
ATTORNEY E. H. CALLAWAY.
BRICK DRIER.
APPLICATION FILED SEPT. 18, 1908.
948,988.
Patented Feb. 15, 1910.
4 SHEETS—SHEET 2.
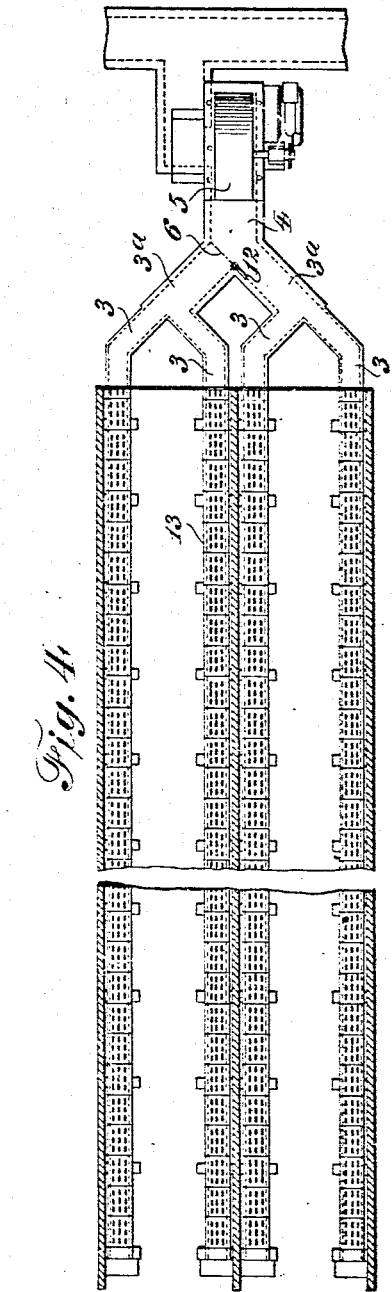
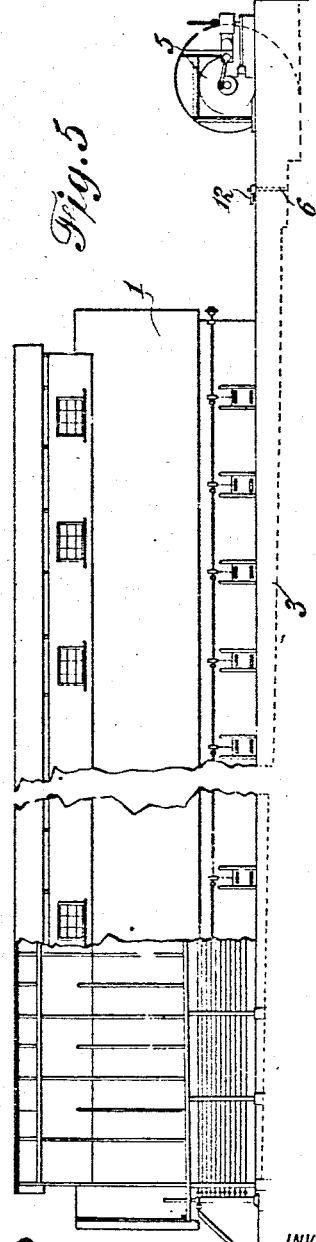

E. H. CALLAWAY.
BRICK DRIER.
APPLICATION FILED SEPT. 18, 1908.
948,988.
Patented Feb. 15, 1910.
4 SHEETS—SHEET 3.
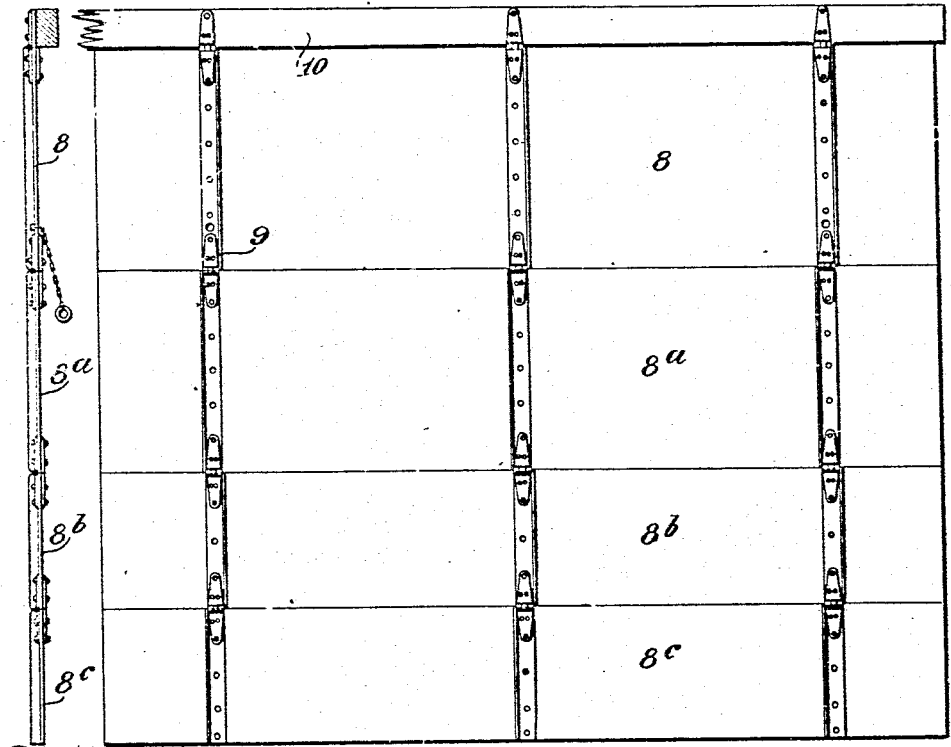
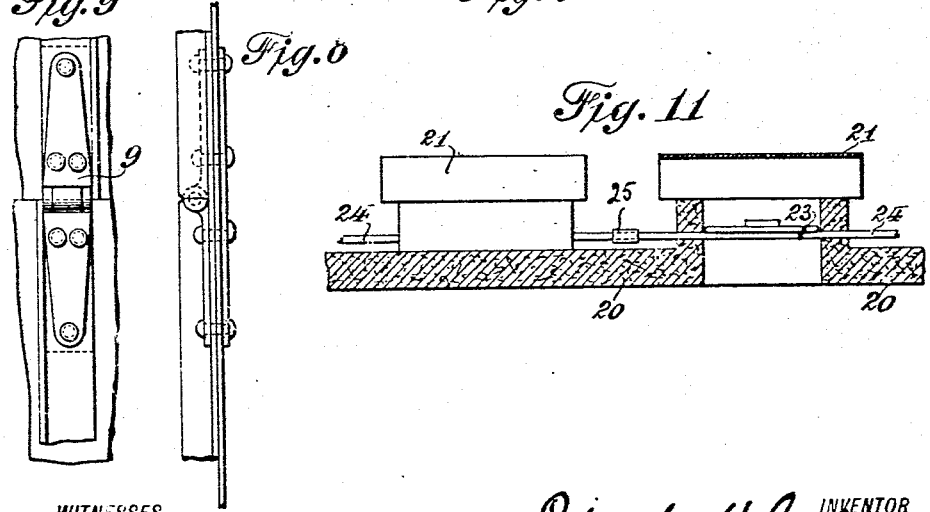
WITNESSES
INVENTOR
Edward H. Callaway,
BY
ATTORNEY E. H. CALLAWAY.
BRICK DRIER.
APPLICATION FILED SEPT. 18, 1908.
948,988.
Patented Feb. 15, 1910.
4 SHEETS—SHEET 4.
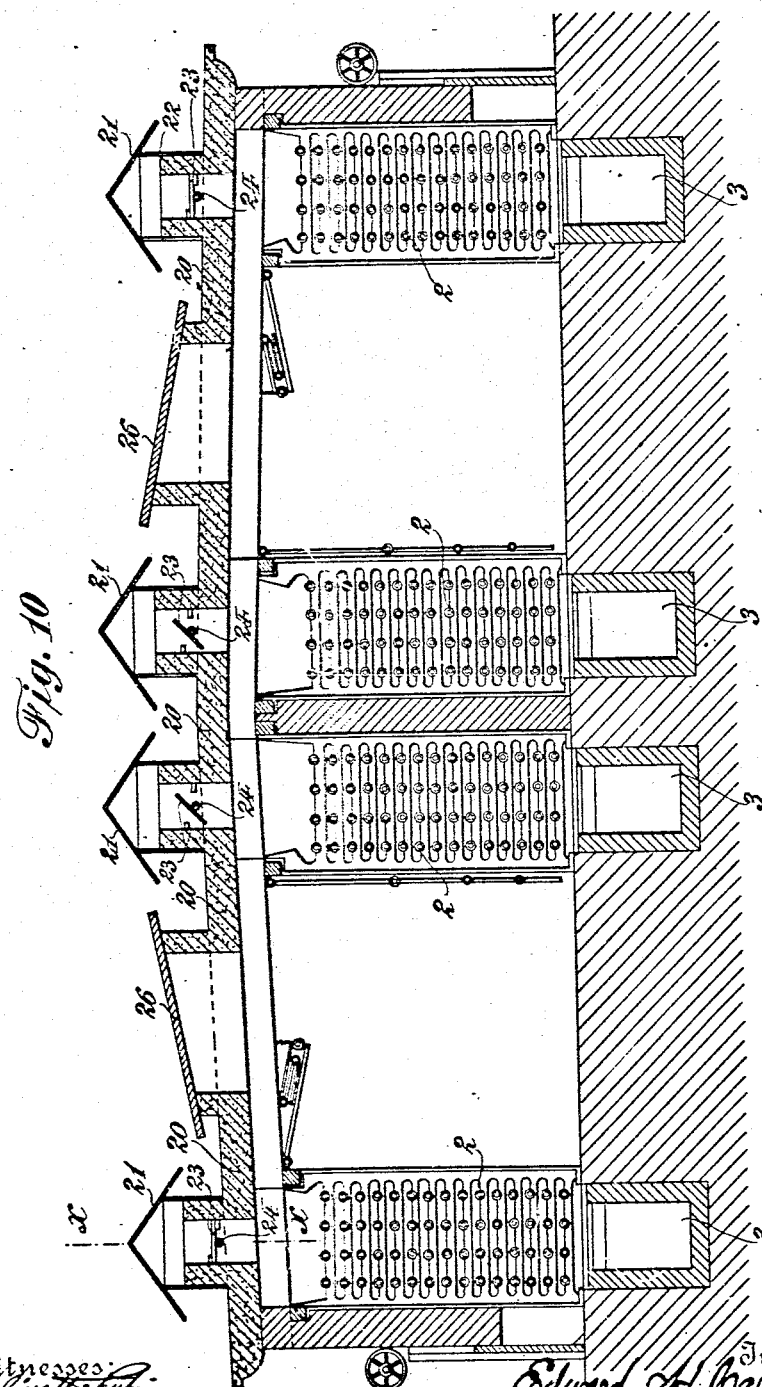

UNITED STATES PATENT OFFICE.

EDWARD H. CALLAWAY, OF WESTFIELD, NEW JERSEY, ASSIGNOR TO THE AMERICAN CLAY MACHINERY COMPANY, OF BUCYRUS, OHIO, A CORPORATION OF OHIO.

BRICK-DRIER.

948,988.      Specification of Letters Patent.     Patented Feb. 15, 1910.

Application filed September 18, 1908. Serial No. 453,643.

*To all whom it may concern:*

Be it known that I, EDWARD H. CALLAWAY, a citizen of the United States of America, residing at Westfield, in the county of Union and State of New Jersey, have invented certain new and useful Improvements in Brick-Driers, of which the following is a specification, reference being had therein to the accompanying drawing.

My present invention relates to an apparatus for drying brick and other similar articles.

More particularly it refers to a brick-drying apparatus in which the drying is accomplished by means of a rack of steam heating pipes, or by means of the waste heat supplied from the kiln, or both.

The object is to provide an improved and simplified apparatus whereby the waste heat from the kiln may be utilized in drying the bricks, and whereby an alternative system may be provided, using at one time the waste heat from the kiln, and at another time the steam heat from the drying racks, whichever may be found preferable.

The invention, therefore, consists essentially in the construction, combination and arrangement of parts, substantially as will be hereinafter described and claimed.

In the accompanying drawing, illustrating my invention, Figure 1 is a front elevation of my improved brick drier, the ducts for conveying the waste heat and certain other parts being shown in section. Fig. 2 is a top plan view of one of the plates covering the waste heat tunnel. Fig. 3 is an edge view of the same. Fig. 4 is a diagrammatic plan view of my improved brick-drying apparatus, and shows the arrangement of the ducts and the blower mechanism for delivering the waste heat under pressure thereto, in order that it may effectively reach the drier. Fig. 5 is a side elevation partly broken away and partly in section of my improved brick drier, and indicates the inclined nature of the waste heat tunnels which contract in size at the remote end of the drier. Fig. 6 is an enlarged detail side view of a series of folding leaves which constitute the removable cover or partition at one side of the pipe rack. Fig. 7 is an edge view of the same. Figs. 8 and 9 represent additional details, more particularly the hinge employed to fasten together the leaves of which the said partition is composed. Fig. 10 is a transverse vertical section of the drying shed constructed in a modified manner with a view to making it entirely fire-proof. Fig. 11 is a detail partial longitudinal section of the roof of the shed on the line $x$ $x$ of Fig. 10, and shows the arrangement of the air valves.

Similar characters of reference designate corresponding parts throughout the different figures of the drawing.

1 designates the brick-drying shed which may be of any suitable shape and design, and on which I lay no separate claim at this time. Obviously it may vary in shape and size within very wide limits. Within the shed 1 are the pipe racks 2, of which there may be any number arranged in any desired manner, and operating in the customary fashion for racks of this type, for the purpose of drying the bricks which are placed thereon. In the example of my invention, illustrated in the drawings, it will be seen that each half of the shed 1 contains two rows of brick-drying racks 2. Between the two racks 2 on each side of the shed, there may be a conveyer 7, as indicated in Fig. 1, for carrying the bricks into the drier. The particular kind of pipe rack may vary greatly, and I do not wish to be restricted to any special kind. I may use the form described and claimed in my co-pending application for Letters Patent on brick drying rack, filed March 20, 1908, Serial No. 422,355, or that described and claimed in my other co-pending application for Letters Patent on brick drier, filed March 25, 1907, Serial No. 364,503, or that shown in my other co-pending application for Letters Patent on steam distributing apparatus, filed March 20, 1908, Serial No. 422,356, or any other style of pipe rack that may serve the purpose.

The racks 2 are capable of being effectually inclosed so that the air therein may be heated to the proper temperature to dry the bricks on the brick-drying supports. The means for inclosing the racks consists essentially of a hinged top cover 27 in the form shown in Fig. 1, and also of a sectional partition or side cover shown in Fig. 1, and in detail in Figs. 6, 7, 8 and 9, said side partition being composed of the leaves 8, 8$^a$, 8$^b$ and 8$^c$, which are hinged together by means of hinges 9. This partition is hinged to some stationary or fixed part of the frame-work above the drying rack 2, as, for instance, the beam 10 (see Fig. 1). The sectional partition may, therefore, be allowed to drop down alongside of the rack 2 in the position shown in Fig. 6, where all the leaves occupy a vertical position; or it may be folded up into the position shown in Fig. 1, and hung by means of a hook 11; or it may be partly folded, as also indicated at the right-hand rack 2 in Fig. 1, it thus being possible to entirely shut in the rack 2 or to partially inclose it. The sectional cover or partition therefore enables the rack to be inclosed as much as may be necessary to create therein the proper degree of heat for drying the brick. Obviously in addition to the sectional cover capable of being opened and closed as I have explained, the racks are inclosed on all the other sides, while at the top there is the movable cover 27 already mentioned.

Directly beneath the pipe racks 2 are arranged longitudinal ducts or tunnels 3 which receive the waste heat from the kiln. These tunnels are shown in cross section in Fig. 1, where they are seen to be below the level of the earth, but with their top side preferably in the same plane as the surface of the ground. Said tunnels are of any desirable length, and as shown in Fig. 4 they connect with a common trunk tunnel 4, in conjunction with which is arranged a fan or blower 5 by means of which the waste heat from the kiln is forced through the tunnels or ducts. In the present example of my invention, inasmuch as there are two rows of racks in each half of the shed, it is convenient to have parallel tunnels 3, 3 in each half of the shed immediately under the two rows of pipe racks, as clearly indicated in Figs. 1 and 4, and under these circumstances these pairs of tunnels 3, 3 have their members uniting with each other at the ends by union pipes 3ª, said unions 3ª entering the main trunk 4 as already mentioned. At the junction of the union pipes 3ª with the main trunk tunnel 4, I locate a valve 6 of any suitable construction having an external handle 12, and by means of said valve the hot air may be turned into one or the other of the branch ducts 3ª and thus directed to one side or the other of the drying apparatus, or if desired, by placing the valve midway, the waste heat may be allowed to pass to both sides of the drier. In other words I employ at the junction of the main trunk tunnel with the branch tunnel some sort of an effective valve device 6 for controlling the passage of the heat and for shutting it off when desired.

The ducts or tunnels 3 are so constructed preferably that they gradually narrow in size as they run from the lower toward the far end of the drier, as indicated in dotted lines in Fig. 5, so that as the intensity of the pressure and the heat tend to decrease the volume of the air will decrease likewise, and hence the heating effect will be kept up substantially the same throughout the entire length of the ducts. These ducts or tunnels are covered with plates 13 placed thereon flush, or, at least, preferably flush, with the ground surface, or the surface of the floor of the drying structure. Plates 13 are provided with a suitable number of slots or openings 14 through which the hot air passes into the space where the bricks or other articles to be dried are located. The slots or openings 14 may be of any desired size. These plates lie on the top of the ducts end to end with each other, and are easily removable and replaceable when desired.

It is obvious that the essential principle of my invention consists in employing the waste heat from the kiln for drying bricks in the drier, and in so arranging the construction of the drier that when this waste heat is not available to use for drying the steam heat may be derived from the heating racks in the customary way, and the procedure of drying the brick carried on by means of said steam heat. But, of course, for purposes of cheapness and economy, it is highly desirable to utilize the waste heat from the kiln, and so I have arranged to direct it into the drying apparatus in an effective and easy manner. Thus the apparatus is an alternative one, capable of drying the brick by means of the heat from the kiln at one time, and adapted at another time to dry the brick by means of the heat from the drying rack, the result in either case being equally competent.

In Figs. 10 and 11 I have represented a modification in the construction of the shed and in the means for regulating and controlling the air draft through the same and especially through the pipe racks. In this modified construction, one of my leading objects is to render the building fire-proof, and to this end the roof 20 is made of concrete of some considerable thickness, as indicated in Figs. 10 and 11, said concrete material being prepared and applied in any desired manner. Of course when the roof is thus constructed, it is not only fire-proof but is strong and durable. Roof 20 is provided with longitudinal cupolas 21 of greater or less size. These are open to the atmosphere on the sides at 22, and are provided interiorly with valves 23 which control the draft between the atmosphere and the interior of the drying rack, and consequently between the atmosphere and the waste heat ducts 3. The said valves 23 are hung on operating rods 24 which run longitudinally through the cupolas 21 and are provided at any desired point with an operating hand-wheel, or some other suitable contrivance, for the purpose of easily manipulating them. In order to conveniently apply and arrange the operating rod 24, the cupola devices 21 are broken at certain points; or, in other words, are made in short lengths, as indicated in Fig. 11, and the ends of the rod 24 allowed to meet between the cupola sections and to be tied together by suitable unions, as at 25, this construction being simply to enable the parts to be put together the more easily and operated with greater facility. Furthermore, the fire-proof roof 20 is provided with suitable sky-lights 26 which may be of any desired size and pattern.

Many modifications in the exact construction and arrangement of the various parts may be made without exceeding the scope of the claims.

Having thus described my invention, what I claim as new and desire to secure by Letters Patent, is:

1. In a brick drier, the combination with a shed containing a drying room, said room inclosing a drying rack composed of steam pipes, of a waste heat duct leading from a kiln into the room and beneath the rack, means for forcing the hot air from said kiln through said duct, means for supplying steam to supply pipes, dampers in the top of the inner and outer inclosures and dampers in the lower part of said interior drying room, all arranged to allow the waste heat from the kiln or the heat from the drying rack to be alternately or collectively employed.

2. The combination with a brick-kiln, of a brick drying apparatus including an outer shed containing an inner inclosure, a drying rack composed of steam heating pipes, upper and lower dampers in said interior inclosure, a longitudinal waste heat tunnel leading from the kiln to a point immediately below said rack, together with a blower for forcing the heat through the tunnel and rack, whereby the brick may be dried by the heat from the kiln when steam is off.

3. In a brick drier, the combination with a drying apparatus consisting of a shed containing a steam heating rack, a waste heat tunnel leading from a kiln, said tunnel narrowing in size toward the far end of the drier, a series of perforated removable covers on the said tunnel, a blower device for forcing the hot air from the kiln through the tunnel to the drier, and means for ventilating the shed.

4. In a brick drier, the combination with an outer shed containing a drying rack for supporting and drying the brick, of interiorly located means for inclosing the rack, ventilating devices for the inclosing means, a waste heat tunnel beneath the rack, said tunnel being provided with perforated covers for allowing the emergence from the tunnel of the hot air to dry the brick, and a blower mechanism for forcing the hot air to the drier through the tunnel.

5. The combination in a brick drier, of a steam heated drying rack, means for inclosing the latter including a folding sectional side partition and top dampers adapted to be opened to a greater or less extent, and a valved waste heat tunnel which delivers hot air into the inclosed place where the rack is located, all arranged so that when the waste heat from the kiln is insufficient to dry the brick the drying rack may be supplied with steam.

6. In a combined waste heat and pipe rack drier, the combination with a valved duct for conveying waste heat from a kiln, of means for forcing air through said duct, and inclosures provided with inlet and outlet dampers, said inclosures containing the rack driers.

7. In a drying apparatus for brick and the like, a fire-proof structure having a refractory roofing of concrete or similar material, a series of ventilators in said roof provided with internal valve devices for admitting atmospheric air, a common operating shaft extending through all the ventilators, and one or more ducts for conveying waste heat from a kiln, all combined and arranged substantially as described.

8. In a drying apparatus for brick and the like, a fire-proof structure having a refractory roofing of concrete or similar material, a series of ventilators in said roof provided with internal valve devices for admitting atmospheric air, an externally jointed shaft extending through the ventilators and across the intervening spaces, and one or more ducts for conveying waste heat from a kiln, all combined and arranged substantially as described.

9. In a combined waste heat and pipe rack drier, the combination of the shed having upper openings to the atmosphere, valves arranged in connection with said openings, means for operating said valves, racks for supporting the bricks or other articles to be dried, means for inclosing said racks, and waste heat tunnels leading from a kiln, said tunnels being located below the racks and in line with the upper valve devices.

10. In a brick-drier, the combination with a drying inclosure containing suitable racks and means for supplying heat thereto, of a series of ventilators in the roof of the inclosure, a controlling valve in each of said ventilators, a longitudinal jointed shaft extending through the ventilators and intervening spaces, and exterior means for locking and unlocking said joints.

11. In a brick-drier, the combination with an inclosure containing brick-drying racks along its opposite sides and provided with a parallel conveyer space between said racks, and means for inclosing the racks upon all sides, said means including a pair of partitions composed of hinged folding sections arranged to close or open the contiguous sides of said inner inclosures either separately or together.

12. In a brick-drier, the combination with an inclosure containing brick-drying racks along its opposite sides and provided with a parallel conveyer space between the said racks, means for inclosing the racks on all sides, means for supplying heat to the racks, valves for regulating the heating means, and folding partitions forming the contiguous sides of the inner inclosures.

In testimony whereof I have affixed my signature in presence of two witnesses.

EDWARD H. CALLAWAY.

Witnesses:
 FRANK PAUL,
 C. B. SCHROEDER.